(12) United States Patent
Kasarabada et al.

(10) Patent No.: US 11,490,160 B2
(45) Date of Patent: Nov. 1, 2022

(54) SCREEN RECORDING FROM A REMOTE DEVICE

(71) Applicant: Apple Inc., Cupertino, CA (US)

(72) Inventors: Vikrant Kasarabada, Los Altos, CA (US); Gennadiy Shekhtman, Campbell, CA (US); Elena Leyfman, Los Gatos, CA (US); Gregory R. Chapman, San Jose, CA (US); Chendi Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 16/125,340

(22) Filed: Sep. 7, 2018

(65) Prior Publication Data

US 2020/0084511 A1 Mar. 12, 2020

(51) Int. Cl.

| | |
|---|---|
| *H04N 21/241* | (2011.01) |
| *H04N 21/254* | (2011.01) |
| *H04N 21/258* | (2011.01) |
| *H04N 21/431* | (2011.01) |
| *H04N 21/433* | (2011.01) |
| *H04N 21/4627* | (2011.01) |
| *H04N 21/472* | (2011.01) |
| *H04N 21/41* | (2011.01) |
| *H04L 9/40* | (2022.01) |

(52) U.S. Cl.
CPC ..... *H04N 21/4627* (2013.01); *H04N 21/4135* (2013.01); *H04N 21/4312* (2013.01); *H04N 21/4334* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2009/0136215 A1 | 5/2009 | Barton et al. | |
| 2010/0064215 A1* | 3/2010 | Portman | G06F 3/14 |
| | | | 715/704 |
| 2011/0261142 A1 | 10/2011 | Shanmukhadas et al. | |
| 2014/0218385 A1* | 8/2014 | Carmi | G06T 7/136 |
| | | | 345/620 |
| 2015/0378561 A1* | 12/2015 | Ollinger | G06Q 30/016 |
| | | | 707/769 |
| 2015/0378577 A1* | 12/2015 | Lum | G06F 3/048 |
| | | | 715/720 |

(Continued)

*Primary Examiner* — Brian T Pendleton
*Assistant Examiner* — Jean D Saint Cyr
(74) *Attorney, Agent, or Firm* — Invoke

(57) ABSTRACT

In some implementations, a first device can record a display screen of a second device remotely. For example, the first device (e.g., a remote computing device) can receive information identifying other computing devices on a network. The first device can receive a selection of one of the other computing devices (e.g., the second device) and send a message to the second device to initiate a recording of the display screen of the second device. In response to receiving the message, the second device can record video frames of images presented on the display of the second device. The second device can send the video frames to the first device for display and/or storage. While recording the images presented on the display screen, the second device can present indicia on the display screen of the second device indicating that a screen recording is in progress.

20 Claims, 12 Drawing Sheets

(56) References Cited

U.S. PATENT DOCUMENTS

| | | | |
|---|---|---|---|
| 2015/0381667 A1* | 12/2015 | Brewer | H04W 4/00 709/204 |
| 2016/0037215 A1 | 2/2016 | Cardona | |
| 2016/0127797 A1* | 5/2016 | Ellis | H04N 21/44004 725/39 |
| 2018/0068091 A1* | 3/2018 | Gaidar | G06F 21/16 |

* cited by examiner

SCREEN RECORDING FROM A REMOTE DEVICE

TECHNICAL FIELD

The disclosure generally relates to managing screen recording on computing devices.

BACKGROUND

Screen recording functionality is common on many computing devices. A user simply has to invoke an operating system function, utility, or standalone application to cause the computing device to record images (e.g., graphical user interfaces, individual windows, everything, etc.) presented on a display of the computing device. Unfortunately, screen recording functionality can allow a user to bypass digital rights management protections built into media applications or media systems and recording the display screen of a computing device from a remote device can be cumbersome.

SUMMARY

In some implementations, a computing device can notify a media application when a screen recording may be in progress. For example, the computing device can be configured to send media content provided by the media application for presentation on the display of the computing device to a second destination (e.g., a file, a remote playback device, a remote recording device, etc.) that may result in a recording of the display screen of the computing device. To allow the media application an opportunity to protect the media content from unauthorized recording, the computing device can notify the media application that the media content being sent to the second destination may be recorded. In response to receiving the notification, the media application can modify the presentation of the media content to prevent or downgrade any recording that may be performed.

In some implementations, a first device can record a display screen of a second device remotely. For example, the first device (e.g., a remote computing device) can receive information identifying other computing devices on a network. The first device can receive a selection of one of the other computing devices (e.g., the second device) and send a message to the second device to initiate a recording of the display screen of the second device. In response to receiving the message, the second device can record video frames of images presented on the display of the second device. The second device can send the video frames to the first device for display and/or storage. While recording the images presented on the display screen, the second device can present indicia on the display screen of the second device indicating that a screen recording is in progress.

Particular implementations provide at least the following advantages. Media applications are provided an opportunity to enforce digital rights management policies when a user initiates a screen recording on a computing device. Media applications are provided an opportunity to enforce digital rights management policies when a user causes media content provided by the media application to be sent to remote computing devices (e.g., a remote playback device, a remote recording device, etc.) where digital rights management policies may not be enforced.

A remote computing device can initiate a screen recording of a second computing device wirelessly, over a network. Because the remote computing device can detect and present information identifying other computing devices on the network, a user of the remote computing device can quickly select between a number of computing device available on the network when selecting a second computing device for screen recording. The remote computing device and the remote computing device do not have to be physically, or directly connected by a wired connection. While the screen recording is in progress, the second computing device can present indicia indicating that a screen recording is in progress on the second computing device so that users of the second computing device are warned of the screen recording in progress.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Screen recording functionality is common on many computing devices. A user simply has to invoke an operating system function, utility, or standalone application to cause the computing device to record images (e.g., graphical user interfaces, individual windows, everything, etc.) presented on a display of the computing device.

Unfortunately, screen recording functionality can allow a user to bypass digital rights management protections built into media applications. For example, a media streaming software application may include digital rights management (DRM) protections that prevent the recording and/or sharing of digital media (e.g., movies, videos, music, etc.) by unauthorized users who have not licensed the digital media. However, when the software application sends the DRM protected media to the operating system of a computing device to be presented on the screen (e.g., display) of the computing device, a user may initiate a screen recording and circumvent the DRM protections implemented by the software application. In other instances, the user may cause the computing device to send the digital media to another computing device (e.g., playback device) for presentation to the user. The user may initiate a screen recording on the playback device and circumvent the DRM protections implemented by the software application on the first device. Thus, a mechanism for allowing software applications to enforce DRM protections is needed when media content sent to a display of a computing device is being sent to or presented at a second destination (e.g., recorded to a file, sent to a remote playback device, sent to a remote recording device, etc.) other than the display of the computing device.

Some computing devices (e.g., a first computing device) are configured to allow a second computing device (e.g., remote computing device) to record images presented on a display of the first computing device. However, the second computing device often must be connected to the first computing device through a direct wired connection before the second device is able to record images presented on the screen of the first computing device. A more flexible, dynamic, and less burdensome approach to remotely recording the screen of the first device is needed.

Figure 1:
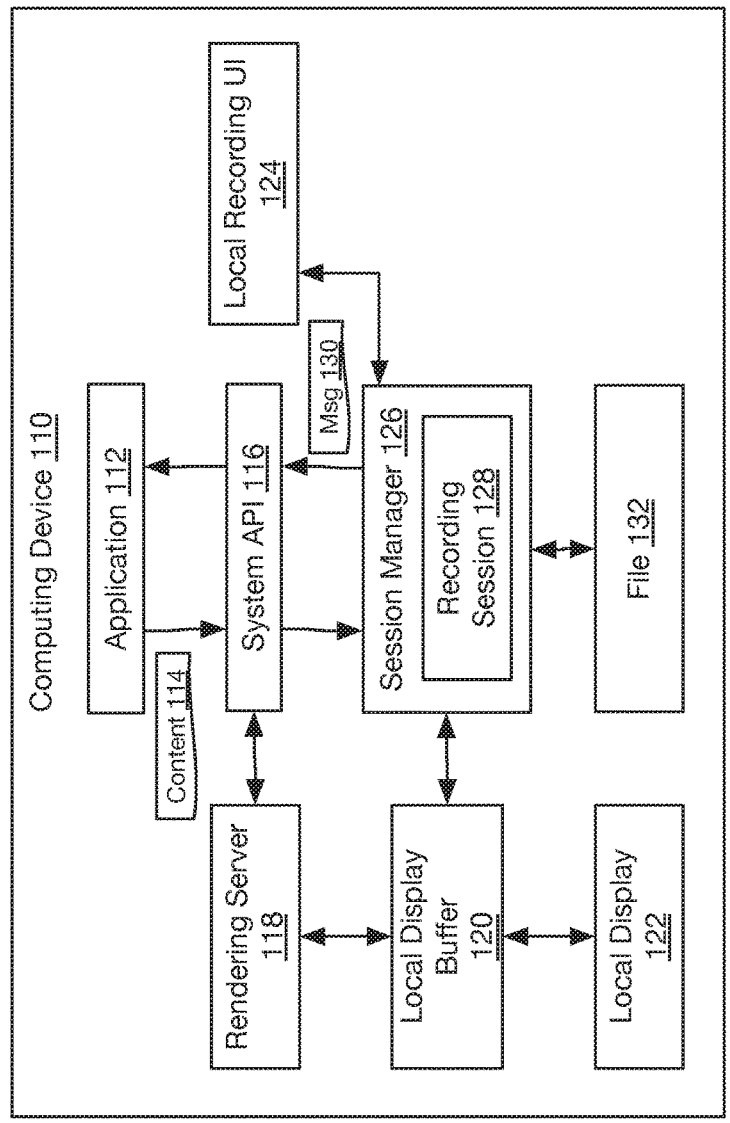
FIG. 1 is a block diagram of an example system for notifying an application of local screen recording in progress.

FIG. 1 is a block diagram of an example system 100 for notifying an application of local screen recording in progress. For example, system 100 can be configured to notify a media application (e.g., application 112) that is providing media content for presentation on a display of a computing device that the display screen of the computing device is being recorded by the operating system of the computing device. To give the media application an opportunity to prevent unauthorized copying or recording of the media content by the computing device, the computing device can notify the application that the media content may be recorded by the computing device. The media application can be automatically notified that screen recording has begun by the operating system of the computing device when the screen recording is initiated. The media application can be notified that screen recording is in progress by the operating system in response to a query from the media application.

In some implementations, system 100 can include computing device 110. For example, computing device 110 can be a laptop computer, a tablet computer, a smartphone, a wearable device (e.g., smartwatch, smart eyeglasses, etc.), a handheld device, an in-vehicle system, and/or a set-top-box.

In some implementations, computing device 110 can include application 112. For example, application 112 can be a software application that provides media content for presentation on a display screen of computing device 110. Application 112 can be a first party application built by the same vendor that built computing device 110 and/or the operating system of computing device 110. Application 112 can be a third-party application built by a vendor different than the vendor that built computing device 110 and/or the operating system of computing device 110. When application 112 is a third-party application, application 112 may not have access to all of the first-party features and/or private application programming interfaces available to a first party application. Thus, application 112 may not have direct access to data stored on computing device 110 or first party notification systems built into computing device 110 that may indicate when a screen recording is in progress.

In some implementations, a user of computing device 110 can interact with application 112 to request that application 112 present media content on a display (e.g., local display 122) of computing device 110. The media content can include music, movies, videos, webpages, and/or other media content. Access to the media content can be protected by digital rights management (DRM) technologies built into the media content and/or application 112. Access to the media content can be protected by proprietary access control technologies created by the vendor of application 112. Application 112 can control which users and/or computing devices have access to the media content provided by application 112 using these access control technologies.

In some implementations, application 112 can send media content to local display 122 for presentation. For example, when application 112 determines that computing device 110 and/or the user of computing device 110 should be allowed access to media content provided by application 112, application 112 can send the media content 114 to an operating system (OS) application programming interface (API) 116 of computing device 110. For example, application 112 can send media content 114 to rendering server 118 through a public display API 116 of the operating system of computing device 110.

In some implementations, rendering server 118 can process the media content 114 for presentation on the local display (e.g., local display 122) of computing device 110 and store the processed media content in local display buffer 120. For example, rendering server 118 can render image frames (e.g., video frames) corresponding to media content 114 that are suitable for presentation on local display 122 (e.g., based on the capabilities of local display 122). Local display 122 can then read the rendered frames from local display buffer 120 and present the rendered frames on local display 122.

In some implementations, computing device 110 can include local recording user interface 124. For example, local recording user interface 124 can be a graphical user interface of the operating system of computing device 110. Local recording user interface can present a graphical object (e.g., button, slider, etc.) on local display 122 that a user can manipulate to initiate a local screen recording on computing device 110. For example, in response to receiving user input to initiate a local screen recording, local recording user interface 124 can send a local screen recording command to session manager 126 (e.g., an operating system component) to initiate a screen recording session.

In some implementations, in response to receiving the screen recording command from local recording user interface 124, session manager 126 can create recording session 128. For example, recording session 128 can be a data structure for managing the attributes and data associated with a screen recording session. Recording session 128 can store screen recording attributes that identify what system or process initiated the screen recording, when the screen recording was initiated, what part of the screen should be recorded (e.g., a particular window, windows of a particular application, the entire display screen, etc.), and a destination (e.g., a second destination other than the local display 122) where to send the frames captured or recorded as part of the screen recording session. For example, the destination can be a local file or media object, a remote playback device, a remote recording device, or other destination, as described herein. In the case of a local recording, the destination can be a file or media object stored on computing device 110. In some implementations, media content provided by application 112 for presentation on display 122 can be sent to display 122, the second destination, or both display 122 and the second destination.

In some implementations, session manager 126 can send a notification to application 112 indicating that a screen recording session has been initiated or requested. For example, in response to receiving the screen recording command from local recording UI, session manager 126 can determine that application 112 is currently presenting content on local display 122 and send application 112 message 130 notifying application 112 that a screen recording session is about to commence.

In some implementations, session manager 126 can send a notification to application 112 indicating that a screen recording session is in progress. For example, before application 112 starts to send media content to local display 122, application 112 can send a message (e.g., query) to session manager 126 through API 116 to determine the current screen recording status of computing device 110. Session manager 126 can determine if a screen recording session is in progress (e.g., determine if recording session 128 exists) and send message 130 to application 112 indicating whether a screen recording session is in progress. If application 112 receives a message indicating that a screen recording session is not in progress, application 112 can send media content 114 to local display 122, as described above.

In response to receiving a message 130 indicating that a screen recording is about to commence or that a screen recording is in progress, application 112 can modify the media content presented by application 112 on local display 122. For example, when a screen recording session is initiated or in progress, session manager 126 can copy frames of video from local display buffer 120 and store the frames in media file 132 (e.g., a media object, a package of media files, etc.). To prevent computing device 110 from making copies of access protected (e.g., DRM protected) media, application 112 can send modified media content to local display 122 when a screen recording has been initiated or is in progress so that the modified media content is copied or recorded instead of the protected media content. For example, instead of sending high-quality media content to display 122, application 112 can send media content that presents a warning instead of the requested media content, watermarked media content, low quality or low-resolution media content, or other types of modified media content in response to receiving the notification that a screen recording has been initiated or is in progress.

Figure 2:
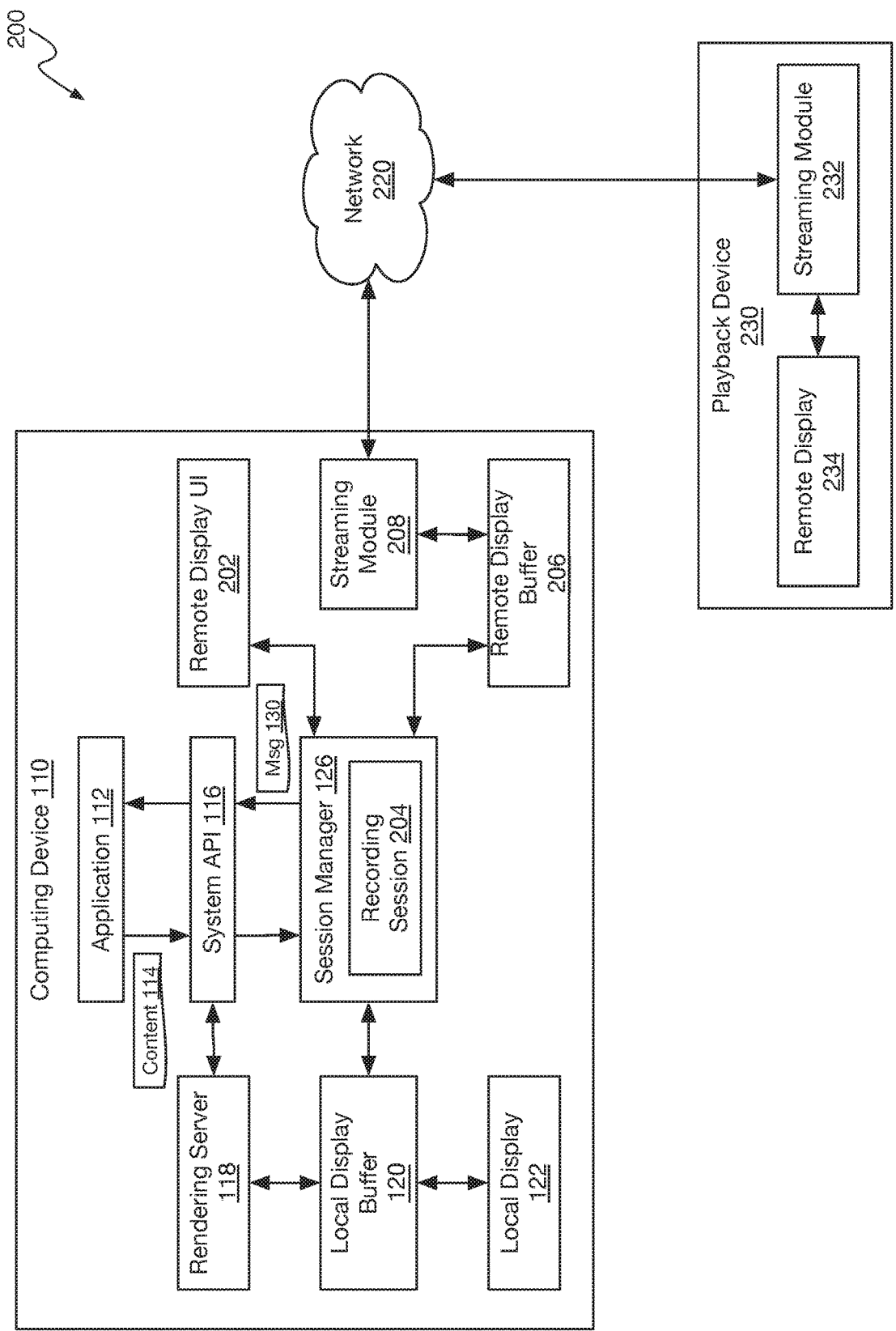
FIG. 2 is a block diagram of an example system for notifying an application of a potential screen recording by a remote playback device.

FIG. 2 is a block diagram of an example system 200 for notifying an application of a potential screen recording by a remote playback device. For example, system 200 can correspond to system 100 described above. System 200 can be configured to notify a media application that is providing media content for presentation on a display of a computing device that the media content may be recorded by a remote playback device. For example, computing device 110 can be configured to stream the media content presented on local display 122 to a remote playback device. To give the media application an opportunity to prevent unauthorized copying or recording of the media content by the remote playback device, computing device 110 can notify application 112 of the possibility that the media content may be recorded by the remote playback device. In one aspect, the media application can be automatically notified that the media content may be recorded by a remote playback device when the media content is streamed to the remote playback device. In another aspect, the media application can be notified that the media content may be recorded by a remote playback device in response to a query from the media application.

In some implementations, system 200 can include computing device 110. For example, computing device 110 can be a computing device, such as a laptop computer, a tablet computer, a smartphone, a wearable device (e.g., smartwatch, smart eyeglasses, etc.), an in-vehicle system, and/or a set-top-box.

In some implementations, computing device 110 can include application 112. For example, application 112 can be a software application that provides media content for presentation on a display screen of computing device 110. For example, a user of computing device 110 can interact with application 112 to request that application 112 present media content on a display (e.g., local display 122) of computing device 110. The media content can include music, movies, videos, webpages, and/or other media content. Access to the media content can be protected by digital rights management (DRM) technologies built into the media content and/or application 112. Access to the media content can be protected by proprietary access control technologies created by the vendor of the software application. Thus, application 112 can control which users and/or computing devices have access to the media content provided by application 112.

In some implementations, application 112 can send media content to local display 122 for presentation. For example, when application 112 determines that computing device 110 and/or the user of computing device 110 should be allowed access to media content provided by application 112, application 112 can send the media content 114 to an operating system (OS) application programming interface (API) 116 of computing device 110. For example, application 112 can send media content 114 to rendering server 118 through a display API 116 of the operating system of computing device 110.

In some implementations, rendering server 118 can process the media content 114 for presentation on the local display (e.g., local display 122) of computing device 110 and store the processed media content in local display buffer 120. For example, rendering server 118 can render image frames (e.g., video frames) corresponding to media content 114 that are suitable for presentation on local display 122. A display driver (not shown) for local display 122 can then read the rendered frames from local display buffer 120 and present the rendered frames on local display 122.

In some implementations, computing device 110 can include remote display user interface 202. For example, remote display user interface 202 can be a graphical user interface of the operating system of computing device 110. Remote display user interface 202 can present a graphical object (e.g., button, slider, etc.) on local display 122 that a user can manipulate to cause computing device 110 to stream the media content intended for local display 122 to a remote playback device (e.g., playback device 230). For example, in response to receiving user input to stream local display 122 to playback device 230, remote display user interface 202 can send a screen recording command to session manager 126 (e.g., an operating system component) to send the media content (e.g., display content) intended for local display 122 to playback device 230.

In some implementations, in response to receiving the screen recording command from remote display user interface 202, session manager 126 can create recording session 204. For example, recording session 204 can be a data structure for managing the attributes and data associated with a screen recording session. Recording session 204 can store screen recording attributes that identify what system or process initiated the screen recording, when the screen recording was initiated, what part of the screen should be recorded (e.g., a particular window, windows of a particular application, the entire display screen, etc.), and a destination (e.g., a second destination other than the local display 122) where to send the frames captured or recorded as part of the screen recording session. For example, the destination can be a local file or media object, a remote playback device, or a remote recording device, as described herein. When the local display screen is recorded for the purposes of presenting the media content intended for the local display screen 122 on a remote playback device 230, the destination can be remote playback device 230. For example, the media content rendered into video frames and stored in local display buffer 120 can be recorded (e.g., copied) and streamed (e.g., sent) to playback device 230 for presentation on a display of playback device 230.

In some implementations, session manager 126 can send a notification to application 112 indicating that a screen recording session (e.g., a remote display session) has been initiated. For example, in response to receiving the screen recording command from local recording UI, session manager 126 can determine that application 112 is currently presenting content on local display 122 and send application 112 message 130 notifying application 112 that a screen recording session is about to commence.

In some implementations, session manager 126 can send a notification to application 112 indicating that a screen recording session (e.g., a remote display session) is in progress. For example, before application 112 starts to send media content to local display 122, application 112 can send a message (e.g., query) to session manager 126 through API 116 to determine the current screen recording status of computing device 110. Session manager 126 can determine if a screen recording session is in progress (e.g., determine if recording session 204 exists) and send message 130 to application 112 indicating whether a screen recording session is in progress. If application 112 receives a message indicating that a screen recording session is not in progress, application 112 can send media content 114 to local display 122, as described above.

In response to receiving a message 130 indicating that a screen recording is about to commence or that a screen recording is in progress, application 112 can modify the media content presented by application 112 on local display 122. For example, when a screen recording session is initiated or in progress, session manager 126 can copy frames of video from local display buffer 120 and store the frames in remote display buffer 206 (e.g., a memory location). Streaming module 208 can then read the video frames from remote display buffer 206 and send the video frames to playback device 230, which may be configured similarly to computing device 110, through network 220 (e.g., local area network, Wi-Fi network, etc.). Streaming module 232 on playback device 230 can receive the video frames sent from computing device 110 and present the video frames on remote display 234 of playback device 230. For example, remote display 234 can be an internal component of playback device 230. Remote display 234 can be a display (e.g., television, monitor, etc.) external to playback device 230.

To prevent computing device 110 from making copies of access protected (e.g., DRM protected) media, application 112 can send modified media content to local display 122 when a screen recording has been initiated or is in progress so that the modified media content is copied or recorded instead of the protected media content. For example, application 112 can send media content that presents a warning instead of the requested media content, watermarked media content, low quality or low-resolution media content, or other types of modified media content in response to receiving the notification that a screen recording has been initiated or is in progress.

Figure 3:
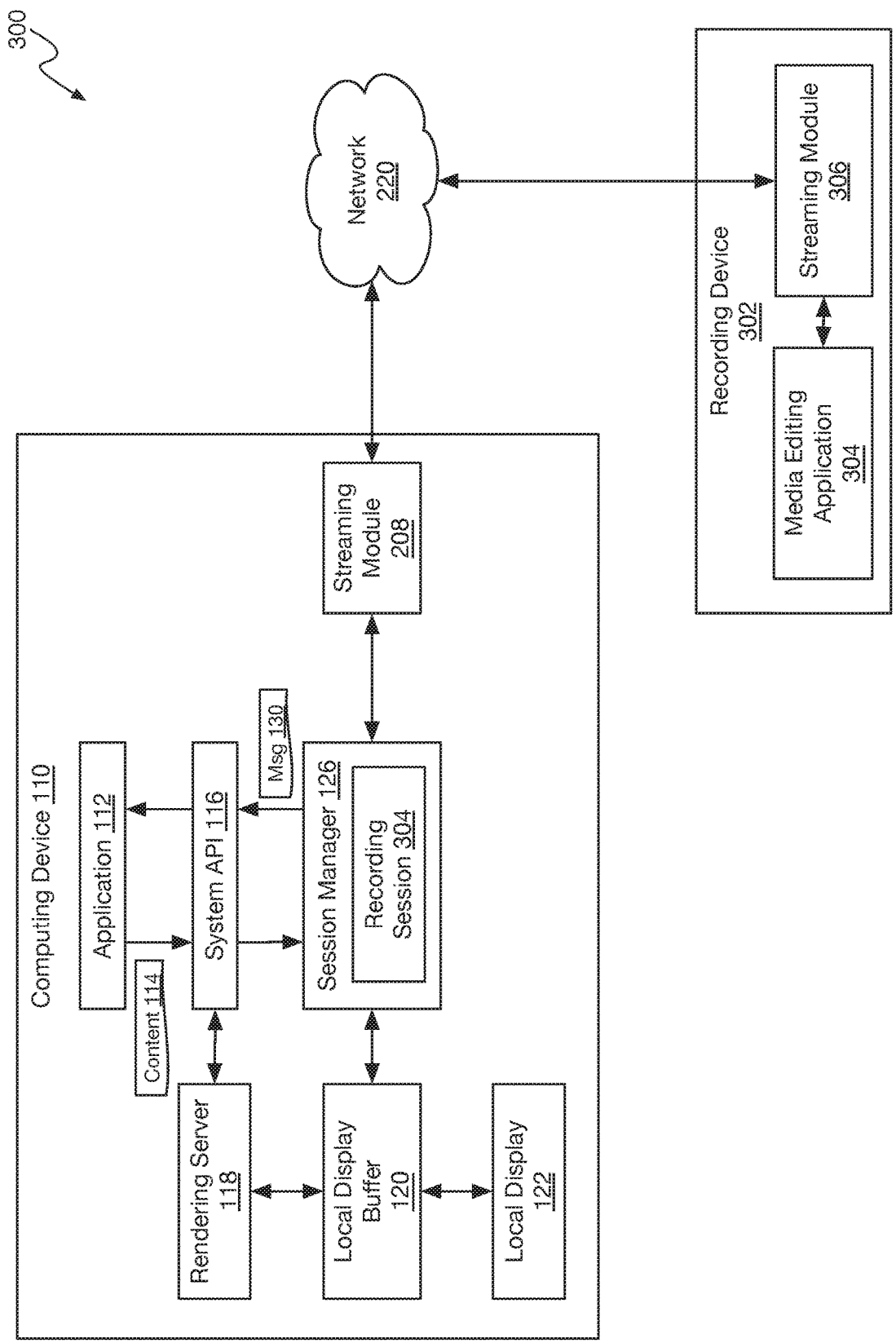
FIG. 3 is a block diagram of an example system for screen recording from a remote recording device.

FIG. 3 is a block diagram of an example system 300 for screen recording from a remote recording device. For example, system 300 can correspond to system 100 and/or system 200 described above. System 300 can be configured to initiate and perform a screen recording of media content intended for presentation on local display 122 of computing device 110 from a remote computing device (e.g., recording device 302). For example, media content intended for presentation on local display 122 can be streamed to recording device 302. Recording device 302 can then present and/or record the streamed media content.

System 300 can be configured to notify a media application that is providing media content for presentation on a display of a computing device that the media content may be recorded by a remote recording device 302. For example, computing device 110 can be configured to stream the media content presented on (or intended for presentation on) local display 122 to a remote recording device. To give the media application an opportunity to prevent unauthorized copying or recording of the media content by the remote recording device 302, computing device 110 can notify application 112 of the possibility that the media content may be recorded by the remote recording device. The media application can be automatically notified that the media content may be recorded by a remote recording device when the media content is streamed to the remote recording device. The media application can be notified that the media content may be recorded by a remote recording device in response to a query from the media application.

In some implementations, system 300 can include computing device 110. For example, computing device 110 can be a computing device, such as a laptop computer, a tablet computer, a smartphone, a wearable device (e.g., smartwatch, smart eyeglasses, etc.), an in-vehicle system, and/or a set-top-box.

In some implementations, computing device 110 can include application 112. For example, application 112 can be a software application that provides media content for presentation on a display screen of computing device 110. For example, a user of computing device 110 can interact with application 112 to request that application 112 present media content on a display (e.g., local display 122) of computing device 110. The media content can include music, movies, videos, webpages, and/or other media content. Access to the media content can be protected by digital rights management (DRM) technologies built into the media content and/or application 112. Access to the media content can be protected by proprietary access control technologies created by the vendor of the software application. Thus, application 112 can control which users and/or computing devices have access to the media content provided by application 112.

In some implementations, application 112 can send media content to local display 122 for presentation. For example, when application 112 determines that computing device 110 and/or the user of computing device 110 should be allowed access to media content provided by application 112, application 112 can send the media content 114 to an operating system (OS) application programming interface (API) 116 of computing device 110. For example, application 112 can send media content 114 to rendering server 118 through a display API 116 of the operating system of computing device 110.

In some implementations, rendering server 118 can process the media content 114 for presentation on the local display (e.g., local display 122) of computing device 110 and store the processed media content in local display buffer 120. For example, rendering server 118 can render image frames (e.g., video frames) corresponding to media content 114 that are suitable for presentation on local display 122. A display driver (not shown) for local display 122 can then read the rendered frames from local display buffer 120 and present the rendered frames on local display 122.

In some implementations, system 300 can include recording device 302. For example, recording device 302 can be configured similarly to computing device 110. In a particular example, recording device 302 could be a laptop computer that a user uses to record content presented by computing device 110 (e.g., a smartphone, tablet computer, set-top-box, etc.).

In some implementations, recording device 302 can include media editing application 304. For example, media editing application 304 can be configured to create, edit, download, present, and/or save media content (e.g., music, movies, videos, etc.) on recording device 302.

When recording device 302 is connected to the same network 220 as other computing devices (e.g., computing device 110 and/or other similar devices), recording device 302 can receive advertisement messages from the other computing devices indicating the availability, features, and/or capabilities of the other computing devices on network 220. Media editing application 304 can present a graphical user interface that identifies computing device 110 and other computing devices from which advertisement messages have been received.

A user of media editing application 304 can select one of the advertising computing devices (e.g., computing device 110) and initiate a recording of the display screen of computing device 110 from media editing application 304 on recording device 302. For example, media editing application 304 can use information in the advertisement message received from computing device 110 to establish a network connection (e.g., through a local area network, Wi-Fi network, etc.) to computing device 110. When establishing the network connection, recording device 302 and computing device 110 can perform an access control procedure, as described below with reference to FIG. 4. For example, the access control procedure can include presenting a pairing code on computing device 110 and receiving the pairing code as user input to recording device 302.

Figure 5:
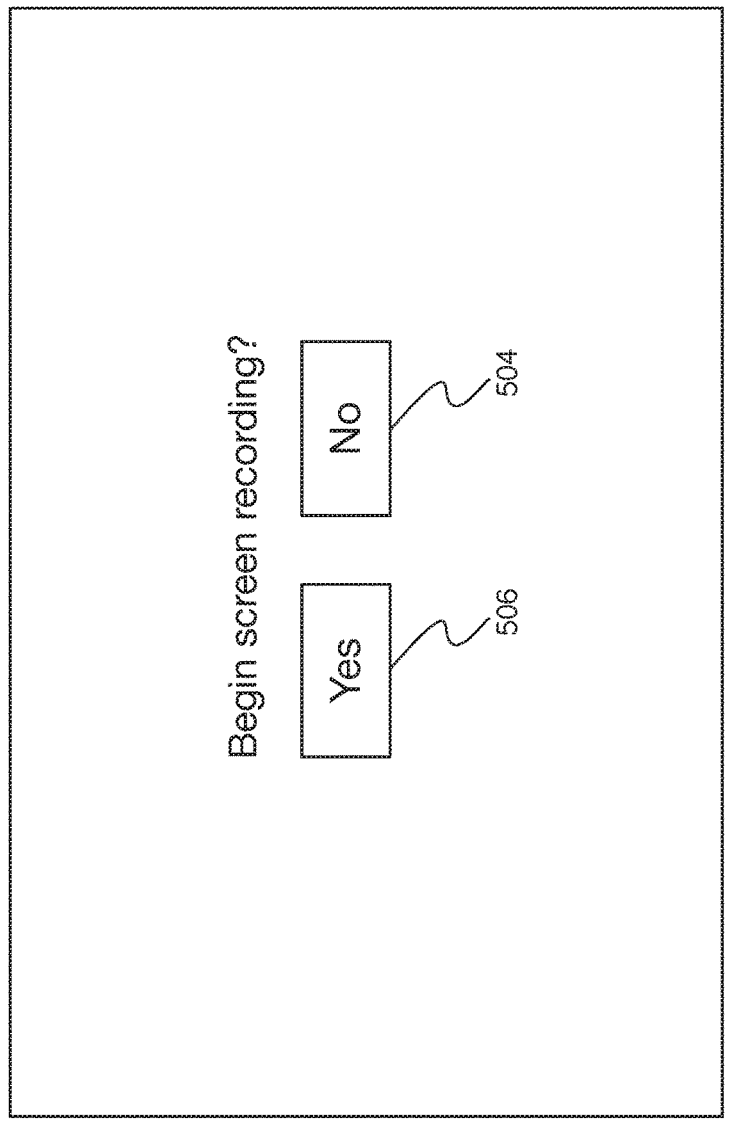
FIG. 5 illustrates an example graphical user interface for presenting a prompt for allowing screen recording on a computing device.

Media editing application 304 can send a message through the established network connection (e.g., through network 220) to computing device 110 to initiate a screen recording session on computing device 110. For example, media editing application 304 can send a request to streaming module 306 to initiate a screen recording session on computing device 110. Streaming module 306 can communicate with streaming module 208 on computing device 110 to request a screen recording session on computing device 110. Streaming module 208 can then send a command to initiate a screen recording session to session manager 126. Session manager 126 can cause computing device 110 to present a prompt requesting user input to allow the screen recording session on computing device 110 to proceed, as illustrated by FIG. 5.

In some implementations, in response to receiving user input to allow the screen recording, session manager 126 can create recording session 304. For example, recording session 304 can be a data structure for managing the attributes and data associated with a screen recording session. Recording session 304 can store screen recording attributes that identify what system or process initiated the screen recording, when the screen recording was initiated, what part of the screen should be recorded (e.g., a particular window, windows of a particular application, the entire display screen, etc.), and a destination (e.g., a second destination other than the local display 122) where to send the frames captured or recorded as part of the screen recording session. For example, the destination can be a local file or media object, a remote playback device, or a remote recording device, as described herein. When media editing application 304 on recording device 302 initiates the screen recording on computing device 110, the destination can be remote recording device 302 and/or media editing application 304. For example, the media content rendered into video frames and stored in local display buffer 120 can be recorded (e.g., copied) and streamed (e.g., sent) to recording device 302 for presentation and/or storage on recording device 302.

In some implementations, session manager 126 can send a notification to application 112 indicating that a screen recording session (e.g., a remote recording session) has been initiated. For example, in response to receiving the screen recording command from streaming module 208 (e.g., originated by media editing application 304), session manager 126 can automatically determine that application 112 is currently presenting content on local display 122 and send application 112 message 130 notifying application 112 that a screen recording session is about to commence.

In some implementations, session manager 126 can send a notification to application 112 indicating that a screen recording session (e.g., a remote display session) is in progress. For example, before application 112 starts to send media content to local display 122, application 112 can send a message (e.g., query) to session manager 126 through API 116 to determine the current screen recording status of computing device 110. Session manager 126 can determine if a screen recording session is in progress (e.g., determine if recording session 304 exists) and send message 130 to application 112 indicating whether a screen recording session is in progress. If application 112 receives a message indicating that a screen recording session is not in progress, application 112 can send media content 114 to local display 122, as described above.

In response to receiving a message 130 indicating that a screen recording is about to commence or that a screen recording is in progress, application 112 can modify the media content presented by application 112 on local display 122. For example, when a screen recording session is initiated or in progress, session manager 126 can copy frames of video from local display buffer 120 and send the frames to streaming module 208. Streaming module 208 can then send the video frames to recording device 302, which may be configured similarly to computing device 110, through network 220 (e.g., local area network, Wi-Fi network, etc.). Streaming module 306 on recording device 302 can receive the video frames sent from computing device 110 and send the video frames to media editing application 304. Media editing application 304 can then present the video frames on a display of recording device 302 and/or store the video frames in a media object (e.g., video file) on recording device 302.

To prevent computing device 110 from making copies of access protected (e.g., DRM protected) media, application 112 can send modified media content to local display 122 when a screen recording has been initiated or is in progress so that the modified media content is copied or recorded instead of the protected media content. For example, application 112 can send media content that presents a warning instead of the requested media content, watermarked media content, low quality or low-resolution media content, or other types of modified media content in response to receiving the notification that a screen recording has been initiated or is in progress.

Figure 6:
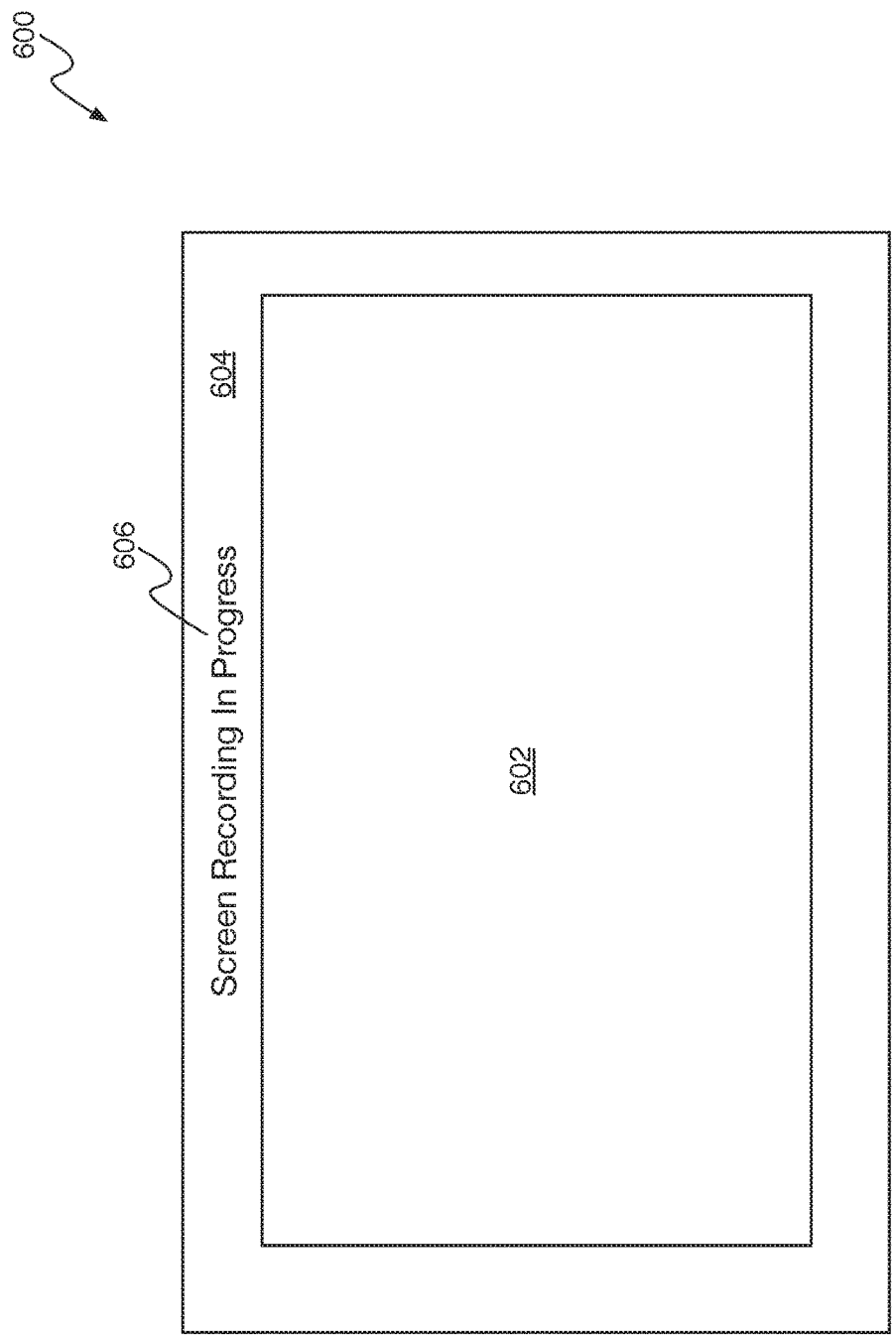
FIG. 6 illustrates an example graphical user interface for presenting indicia of a screen recording in progress.

In some implementations, computing device 110 can present indicia indicating that screen recording is in progress on computing device 110. For example, when a screen recording is in progress on computing device 110, session manager 126 can cause a graphical element (e.g., indicia, warning, etc.) to be presented on local display 122 indicating that a screen recording session is in progress, as illustrated by FIG. 6. While local display 122 may present the graphical element, indicia, warning, etc., during the screen recording session, the graphical element, indicia, warning, etc., may be excluded from the screen recording. For example, the media file created as a result of the screen recording and/or the video frames sent to the remote devices may not include the graphical element, indicia, warning, etc., warning users of computing device 110 of the screen recording in progress.

Figure 4:
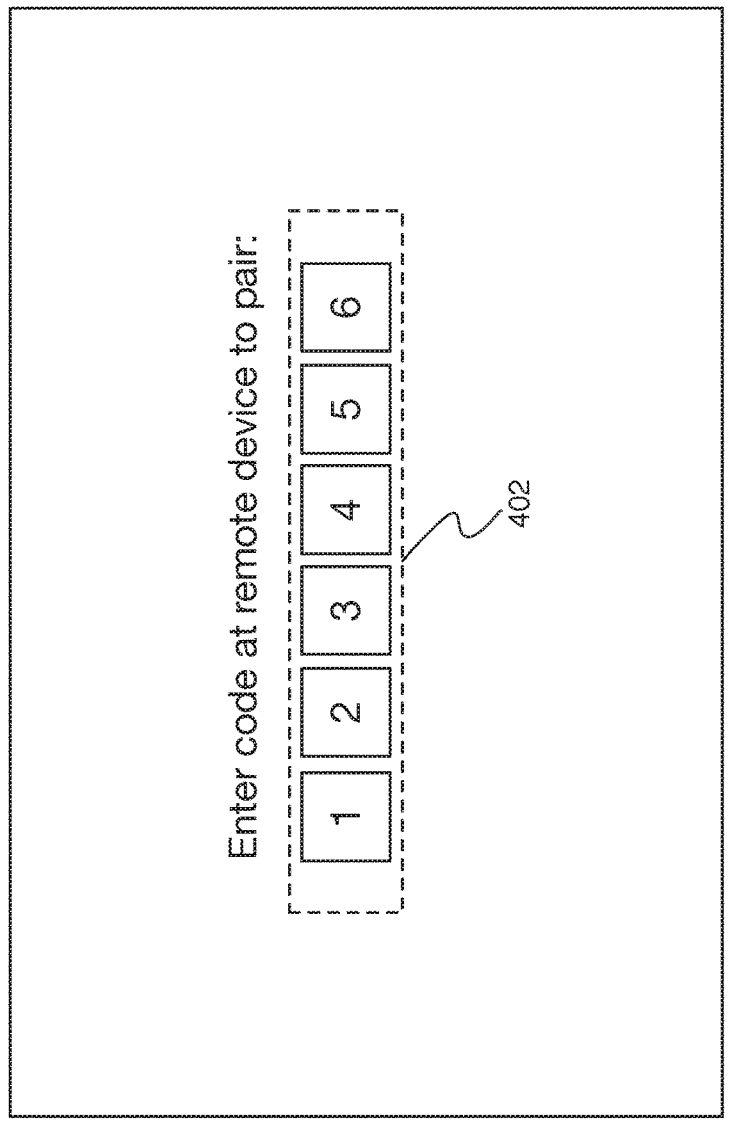
FIG. 4 illustrates an example graphical user interface for pairing a remote recording device with a computing device for the purposes of remote screen recording.

FIG. 4 illustrates an example graphical user interface 400 for pairing a remote recording device with a computing device for the purposes of remote screen recording. For example, when recording device 302 attempts to establish a network connection with computing device 110, computing device 110 can present graphical user interface (GUI) 400 as part of an access control procedure (e.g., pairing process) to determine whether recording device 302 should be allowed to connect to and/or interoperate with computing device 110. In some implementations, GUI 400 can present a textual prompt that instructs a viewing user to provide a pairing code 402 (e.g., sequence of characters or numbers) as input to recording device 302. When recording device 302 receives input specifying the pairing code, recording device 302 can send the pairing code to computing device 110 through network 220. If the pairing code received from recording device 302 matches the pairing code presented by computing device 110, then computing device 110 can allow recording device 302 to access various features or functionality of computing device 110, including the screen recording features described above.

FIG. 5 illustrates an example graphical user interface 500 for presenting a prompt for allowing screen recording on computing device 110. For example, when session manager 126 receives a screen recording command (e.g., as part of initiating a screen recording from a remote device), session manager 126 can cause computing device 110 to present GUI 500, including a textual prompt asking a user of computing device 110 whether the user would like to begin a screen recording session. If the user selects graphical element 504, then session manager 126 can prevent the screen recording session from starting. If the user selects graphical element 506, then session manager 126 can proceed with the screen recording session on computing device 110.

FIG. 6 illustrates an example graphical user interface 600 for presenting indicia of a screen recording in progress. For example, GUI 600 can be presented on a display of computing device 110 when a screen recording session (e.g., as part of a screen recording initiated from a remote device) is in progress on computing device 110. GUI 600 can include media content display area 602 for presenting media content provided by application 112. Media content display area 602 can be inset in a colored (e.g., red, yellow, etc.) frame that indicates that a screen recording session is in progress. GUI 600 can include a textual warning 606 or graphical warning (not shown) that indicates that a screen recording is in progress. These indicia of a screen recording in progress can inform a potential user of computing device 110 that any content presented on a display of computing device 110 may be recorded by computing device 110 or sent to another computing device (e.g., playback device 230, recording device 302, etc.) and may be recorded. In some implementations, the indicia of a screen recording in progress is not recorded, streamed, or stored as part of the screen recording.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 7:
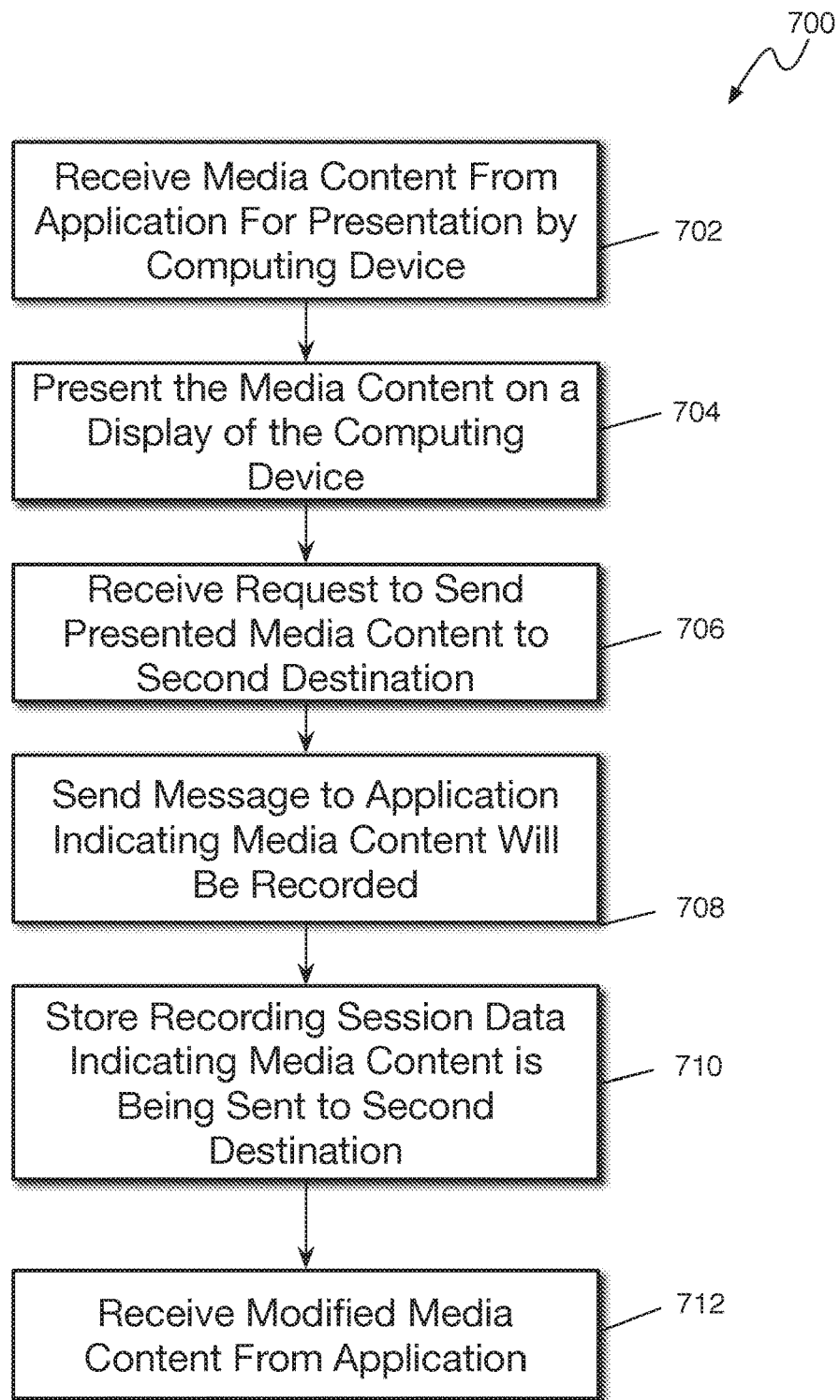
FIG. 7 is flow diagram of an example process for automatically notifying an application that media content sent to a display screen may be recorded.

FIG. 7 is flow diagram of an example process 700 for automatically notifying an application that media content sent to a display screen may be recorded. For example, process 700 can be performed by computing device 110 to notify (e.g., warn) a media content presenting application that media content presented by the application may be recorded. For example, when computing device 110 records screen content to a file or sends the screen content to a remote device that may record the screen content, the application is automatically notified (e.g., without the application making a query) that a screen recording has been initiated or in progress so that the application can take steps to avoid unauthorized duplication of protected or proprietary content.

At step 702, computing device 110 can receive media content from application 112 for presentation by computing device 110. For example, a user of application 112 can request that application 112 present media content on a display of computing device 110. In response to receiving the request, application 112 can provide media content (e.g., movies, video, electronic books, etc.) to computing device 110 for presentation on a display of computing device 110.

At step 704, computing device 110 can present the media content on a display of computing device 110. For example, the media content can be rendered into a display buffer and the rendered content can be presented on a display of computing device 110.

At step 706, computing device 110 can receive a request to send the presented media content to a second destination. For example, when a local screen recording has been requested, the second destination can be a media file stored on computing device 110. When a user provides input requesting that the media content be presented on a remote playback device (e.g., remote display), then the second destination can be the remote playback device. When computing device 110 receives a request from a remote recording device to initiate a screen recording, then the second destination can be the remote recording device.

At step 708, computing device 110 can send a message to application 112 indicating that the media content provided by application 112 will be recorded. For example, based on one or more factors (e.g., an identifier of the remote device, an identifier of an application that is displaying the media content at the remote device, a type of application that is displaying the media content at the remote device, an indication from the remote device that a recording has been or will be initiated, etc.), computing device 110 can estimate that remote devices may be recording the display screen content received by the remote devices. In some instances, computing device 110 can estimate that the remote devices may be recording the display screen content based on the fact that the display screen content is being sent to a remote device. For example, computing device cannot control what remote devices (e.g., remote playback devices, remote recording devices, etc.) may do with the display screen content sent to the remote devices, thus as a precaution computing device 110 can estimate that remote devices may be recording the display screen content received by the remote devices based simply on the fact that the display screen content is being sent to a remote device. Thus, regardless of whether the second destination is a media file or remote device, computing device 110 can send a message to application 112 indicating that the display screen of computing device 110 is being recorded. This may be helpful particularly when computing device 110 cannot control what remote devices (e.g., remote playback devices, remote recording devices, etc.) may do with the display screen content sent to the remote devices.

At step 710, computing device 110 can store recording session data indicating media content presented on the display of computing device is being sent to a second destination. For example, the recording session data can include, among other things, information indicating where the display screen recording (e.g., image frames, video frames, etc.) is being sent (e.g., to a file, to a remote device, etc.). The existence of the recording session data can also be used by computing device 110 to determine whether a recording session is in progress when a subsequent query is made by an application on computing device 110, as described herein.

At step 712, computing device 110 can receive modified media content from application 112. For example, in response to receiving a message indicating that media content presented on a display of computing device 110 is being or is about to be recorded, application 112 can modify the media content provided by application 112 to avoid the unauthorized duplication of access control (e.g., DRM) protected media content. For example, application 112 can be configured to modify the media content provided by application 112 so that a blank screen, a warning, or low-quality media content is presented and/or recorded instead of a higher quality version of the requested media content.

Figure 8:
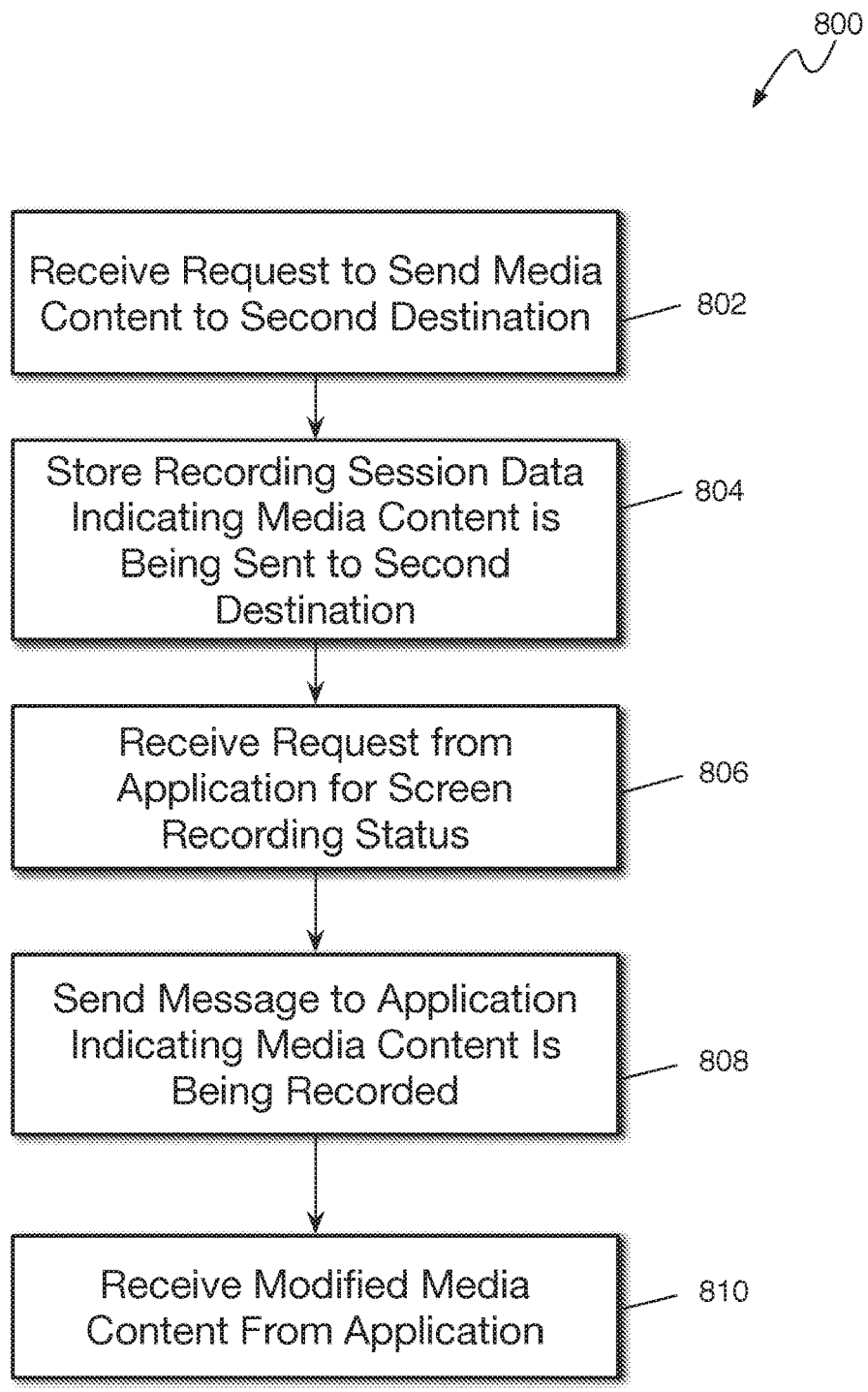
FIG. 8 is flow diagram of an example process for notifying an application that media content sent to a display screen may be recorded in response to receiving a query from the application.

FIG. 8 is flow diagram of an example process 800 for notifying an application that media content sent to a display screen may be recorded in response to receiving a query from the application. For example, process 700 can be performed by computing device 110 to notify (e.g., warn) a media content presenting application that media content presented by the application may be recorded. For example, whether computing device 110 is recording screen content to a file or sending the screen content to a remote device that may record the screen content, the application is notified that a screen recording has been initiated or in progress so that the application can take steps to avoid unauthorized duplication of protected or proprietary content.

At step 802, computing device 110 can receive a request to send media content presented on a display of computing device 110 to a second destination. For example, when a local screen recording has been requested, the second destination can be a media file stored on computing device 110. As another example, when a user provides input requesting that the media content be presented on a remote playback device (e.g., remote display), then the second destination can be the remote playback device. As yet another example, when computing device 110 receives a request from a remote recording device to initiate a screen recording, then the second destination can be the remote recording device.

At step 804, computing device 110 can store recording session data indicating media content presented on the display of computing device is being sent to a second destination. For example, the recording session data can include, among other things, information indicating where the display screen recording (e.g., image frames, video frames, etc.) is being sent (e.g., to a file, to a remote device, etc.). The existence of the recording session data can also be used by computing device 110 to determine whether a recording session is in progress when a subsequent query is made by an application on computing device 110, as described herein.

At step 806, computing device 110 can receive a request from application 112 for the screen recording status of computing device 110. For example, application 112 can send query to an API of computing device 110 requesting the current display screen recording status of computing device 110.

At step 808, computing device 110 can send a message to application 112 indicating that media content presented on the display of computing device 110 is being recorded. For example, computing device 110 can determine that a screen recording session is in progress on computing device 110 based on the recording session data stored on computing device 110.

At step 810, computing device 110 can receive modified media content from application 112. For example, after receiving the message indicating that a screen recording is in progress, application 112 can determine whether to present content on the display of computing device 110 and/or what media content to send to the display of computing device 110. For example, application 112 can modify the media content provided by application 112 to avoid the unauthorized duplication of access control (e.g., DRM) protected media content. For example, application 112 can be configured to modify the media content provided by application 112 so that a blank screen, a warning, or low-quality media content is presented and/or recorded instead of a higher quality version of the requested media content.

Figure 9:
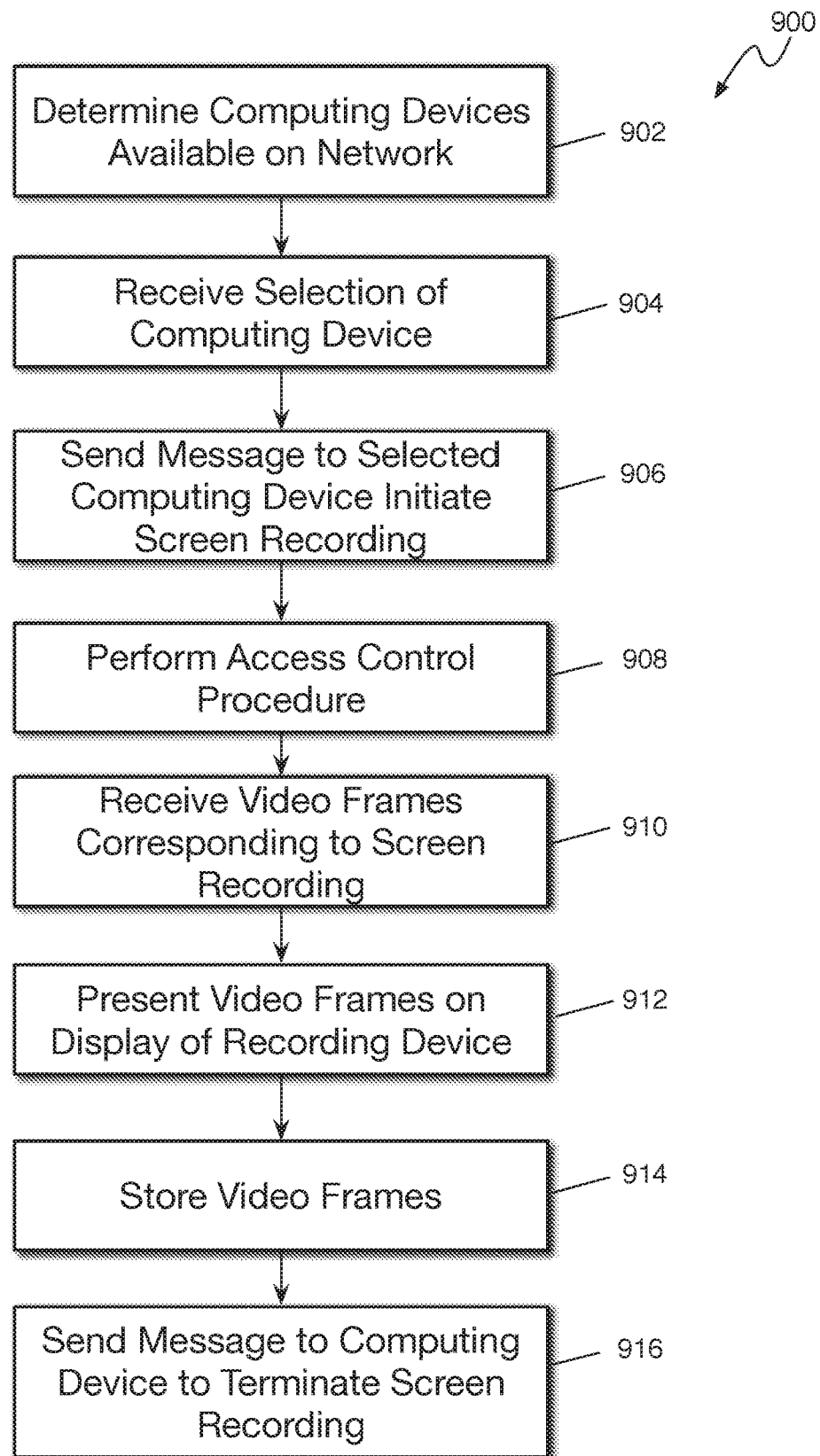
FIG. 9 is an example process for initiating a screen recording from a remote device.

FIG. 9 is an example process 900 for initiating a screen recording from a remote device. For example, process 900 can be performed by remote recording device 302 of FIG. 3 to remotely record content presented on a display screen of computing device 110.

At step 902, recording device 302 can determine the computing devices that are available on the network to which recording device 302 is connected. For example, each computing device connected to the same network as recording device 302 can broadcast their existence and/or availability on the network. Recording device 302 can receive the broadcast messages and use the information in the broadcast messages to determine which computing devices are on the network and how to connect to the broadcast computing devices (e.g., computing device 110).

At step 904, recording device 302 can receive a selection of computing device 110. For example, recording device 302 can include a media editing application. The media editing application can include functionality for initiating a screen recording on another computing device. The media editing application can present a graphical user interface that identifies other computing devices (e.g., computing device 110) that are available on the same network as recording device 302. A user can select one of the identified computing devices and provide input to the media editing application to initiate a recording of a display screen of the selected computing device. For example, the user can provide input to specify that the media editing application should initiate a screen recording of the display of computing device 110.

At step 906, recording device 302 can send a message to the selected computing device to initiate a screen recording of the display of the computing device. For example, recording device 302 can send a message to computing device 110 to initiate a screen recording of the media content presented on the display of computing device 110.

At step 910, recording device 302 can cooperate with computing device 110 perform an access control procedure. For example, before computing device 110 allows recording device 302 to initiate the screen recording, computing device 110 can present a pairing code on the display of computing device 110. The user of computing device 110 and recording device 302 can enter the pairing code into recording device 302 and recording device 302 can send the pairing code to computing device 110 over the network. If the code entered at recording device 302 matches the code presented by computing device 110, then recording device 302 can be allowed to access the functionality of computing device 110 and initiate the screen recording on computing device 110, as described above.

At step 910, recording device 302 can receive video frames corresponding to the display screen recorded on computing device 110. For example, as computing device 110 copies the frames of video being presented on the display of computing device 110, computing device 110 can send the frames of video to the media editing application on recording device 302 over the network.

At step 912, recording device 302 can present the received video frames on the display of recording device 302. For example, the media editing application can present the received frames on the display of recording device 302 in a graphical user interface generated by the media editing application.

At step 914, recording device 302 can store the video frames in a media object stored on recording device 302. For example, the media editing application can store the received video frames in a video file stored on recording device 302.

At step 916, recording device 302 can send a message to computing device 110 to terminate the screen recording. For example, when the user of recording device 302 is finished recording the media content presented on the display of computing device 110, the user can provide input to the media editing application to termination the screen recording session. In response to the input, the media editing application can send a message to computing device 110 to terminate the remote screen recording.

Figure 10:
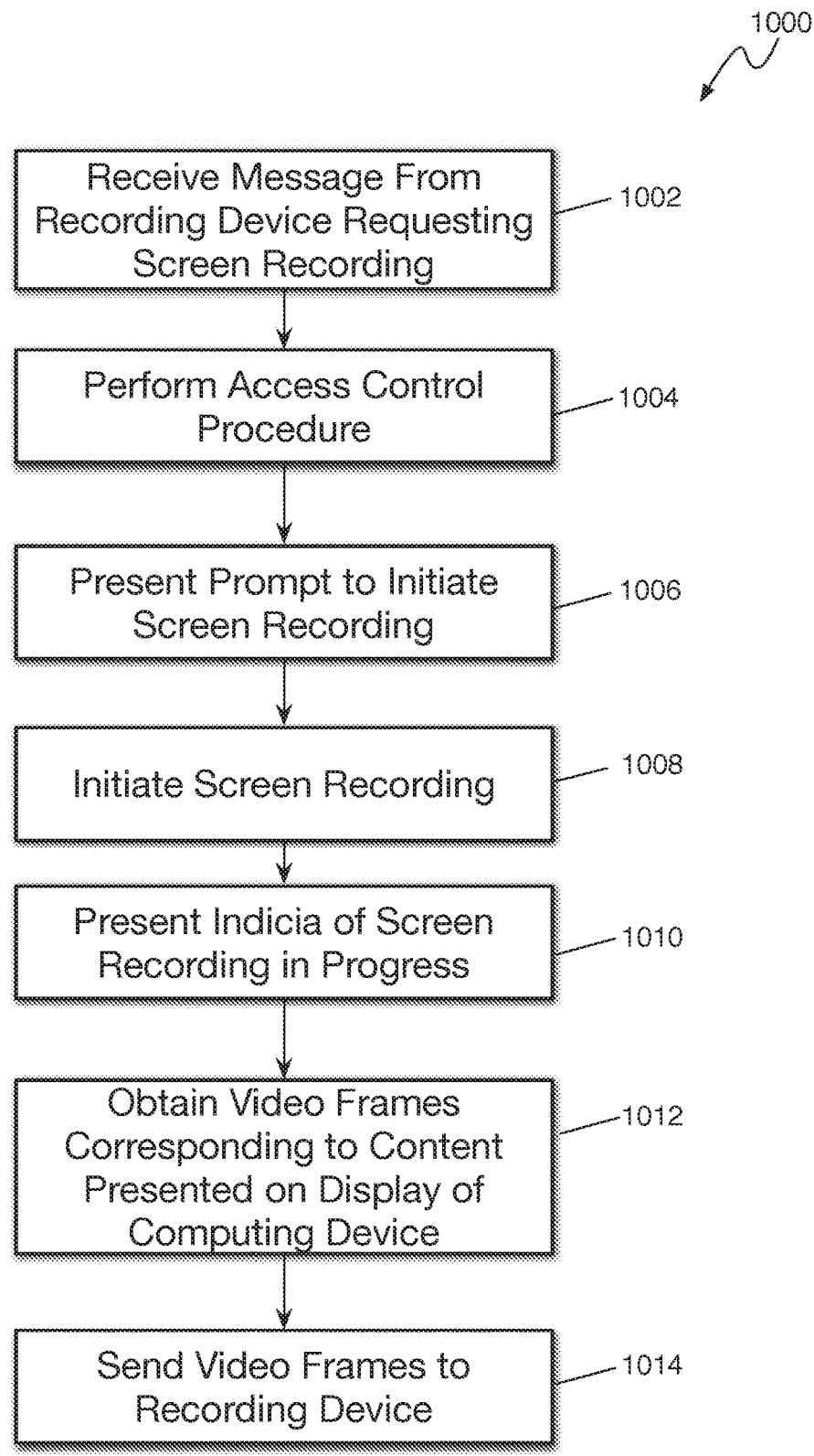
FIG. 10 is an example process for sending a screen recording to a remote recording device.

FIG. 10 is an example process 1000 for sending a screen recording to a remote recording device. For example, process 1000 can be performed by computing device 110 to send or stream content presented on a display screen of computing device 110 to remote recording device 302 so that the displayed content can be recorded by recording device 302.

At step 1002, computing device 110 can receive a message from recording device 302 requesting a screen recording. For example, computing device 110 can broadcast a message indicating the availability of computing device 110 on a network (e.g., local area network, Wi-Fi network, etc.). The broadcast message can include an identifier for computing device 110 and/or other information indicating how to contact and/or interact with computing device 110. For example, the broadcast message can indicate that computing device 110 is configured to provide remote screen recording capabilities. Computing device 110 can receive the screen recording request message from a remote recording device 302 that received the broadcast message.

At step 1004, computing device 110 can perform an access control procedure in cooperation with recording device 302. For example, before computing device 110 allows recording device 302 to receive a screen recording (e.g., image frames, video frames, etc.), computing device 110 will determine whether recording device 302 is authorized to access the features or functionality of computing device 110. To do so, computing device 110 can present a pairing code on a display (e.g., internal display, external display, television, etc.) of computing device 110. After presenting the pairing code, computing device 110 can receive a pairing code from recording device 302. If the received pairing code matches (e.g., is identical to) the received pairing code, then computing device 110 can allow recording device 302 to obtain a recording of the display screen of computing device 110. Stated differently, if the received pairing code matches (e.g., is identical to) the received pairing code, then computing device 110 may send a recording of the display screen of computing device 110 to recording device 302.

At step 1006, computing device 110 can present a prompt to initiate a screen recording of a display screen of computing device 110. For example, computing device 110 can present a prompt (e.g., the prompt of FIG. 5) to obtain the user's authorization to proceed with the screen recording on computing device 110. When the user provides input indicating that the screen recording should not proceed, computing device 110 can prevent the screen recording from proceeding. When the user provides input indicating that the screen recording should proceed, computing device 110 can initiate the screen recording on computing device 110.

At step 1008, computing device 110 can initiate a screen recording. For example, computing device 110 can create a screen recording session. Before or during the screen recording session, computing device 110 can notify media content providing applications that a screen recording session is in progress, as described above.

At step 1010, computing device 110 can present indicia of the screen recording in progress. For example, computing device 110 can present on a display of computing device 110 textual or graphical warnings, colored borders or frames, inset media content, and/or other indicia that a screen recording is in progress so that users of computing device 110 will be warned that any content the user's cause to be presented on the display of computing device 110 may be recorded.

At step 1012, computing device 110 can obtain video frames corresponding to the content presented on the display of computing device 110. For example, computing device 110 can record, capture, copy, etc., rendered frames of video intended for presentation on a display of computing device 110 from a display buffer, as described above.

At step 1014, computing device 110 can send the frames of video to recording device 302. For example, computing device 110 can send the rendered frames of video obtained from the display buffer to recording device 302 through network 220.

Figure 11:
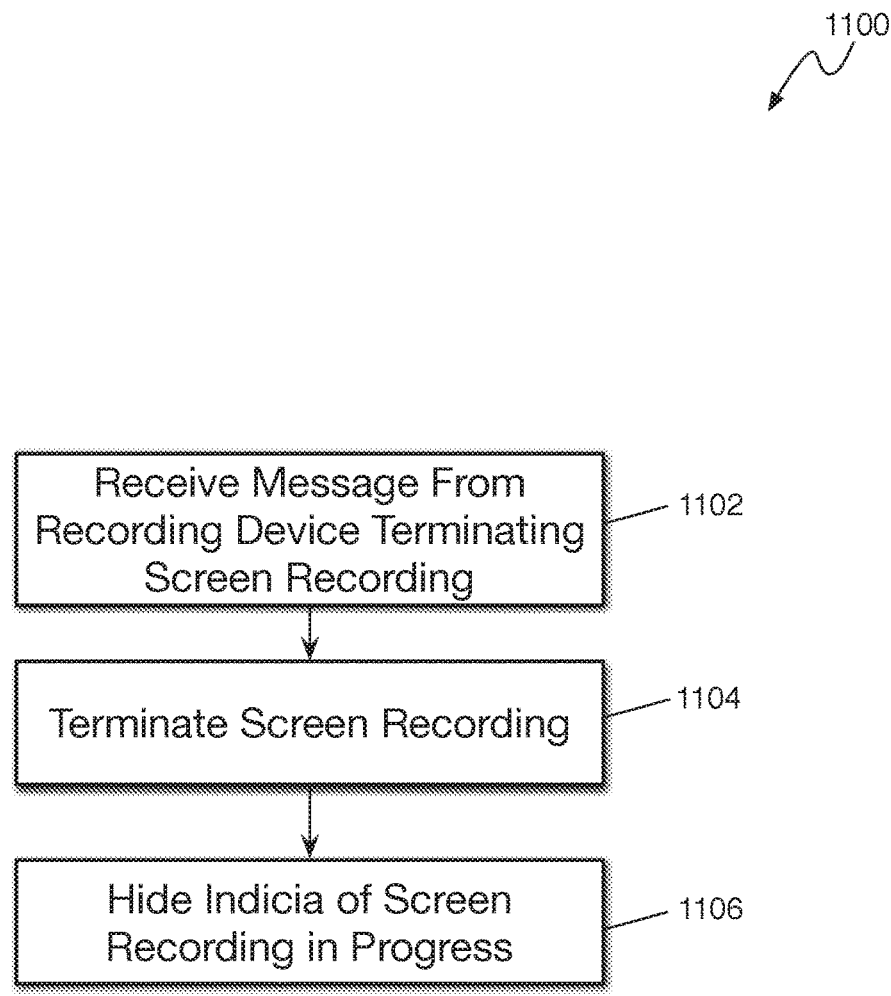
FIG. 11 is an example process for terminating a remote screen recording at a computing device.

FIG. 11 is an example process 1100 for terminating a remote screen recording at a computing device. For example, process 1100 can be performed by computing device 110 to terminate a remotely initiated recording of the display screen of computing device 110.

At step 1102, computing device 110 can receive a message from recording device 302 to terminate the screen recording session. For example, recording device 302 may send the termination message in response to the user providing input to a media editing application indicating that the user wishes to terminate the screen recording session. In some implementations, computing device 110 can generate an internal message or command to terminate the screen recording session when computing device 110 detects that the connection to recording device 302 has been terminated or when computing device 110 receives user input indicating that the screen recording session should be terminated.

At step 1104, computing device 110 can terminate the screen recording session. For example, computing device 110 can stop copying rendered frames of video from the display buffer associated with the display of computing device 110.

At step 1106, computing device 110 can hide the indicia of screen recording in progress. For example, since the media content displayed on computing device 110 is no longer being recorded, the user of computing device 110 no longer needs to be warned of the screen recording. Thus, computing device 110 can hide the indicia of screen recording in progress and present content on the display of computing device 110 using the full display screen (e.g., not inset).

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology provides for recording content presented on a display screen of a computing device. The present disclosure contemplates that in some instances, this recorded data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, recording or collection of, or access to, personal information data. That is, the present disclosure contemplates that hardware and/or software elements can be provided to prevent or block access to or recording of such personal information data. For example, in the case of screen recordings, the present technology can be configured to allow users to select to "opt in" or "opt out" of participation in the screen recording. For example, a computing device that is the subject or target of a screen recording can be configured to warn users of a screen recording in progress or to allow users of the computing device to disable or disallow screen recordings on the computing device. In addition to providing "opt in" and "opt out" options, the present disclosure contemplates providing notifications relating to the access or use of personal information. For instance, a user may be notified upon initiation of a screen recording or during a screen recording that screen recording is about to be commenced or is in progress.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers the possibility of recording of personal information data while recording display screen content, the present disclosure also contemplates that the various embodiments can be implemented or executed without recording such personal information data.

Example System Architecture

Figure 12:
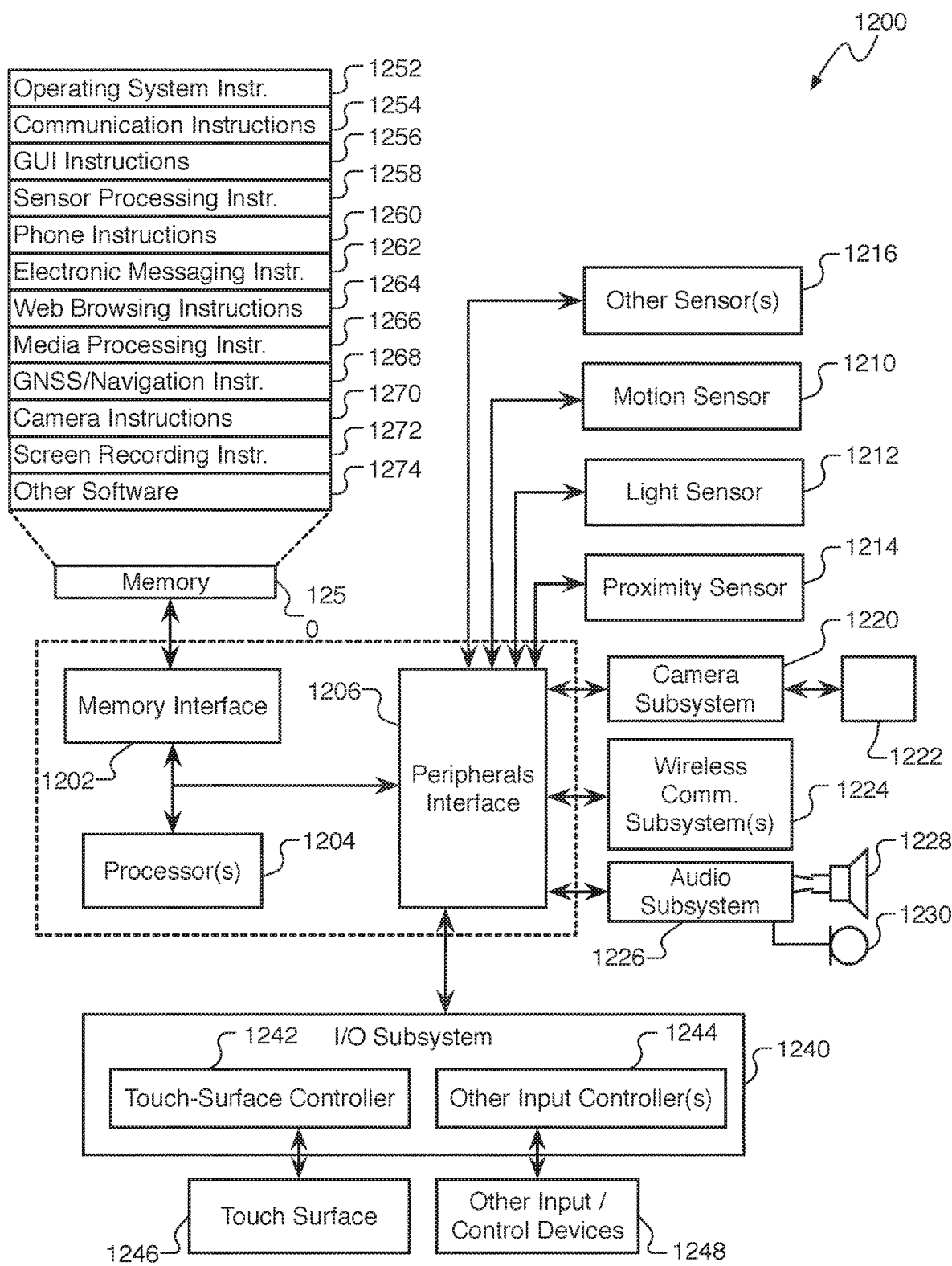
FIG. 12 is a block diagram of an example computing device that can implement the features and processes of FIGS. 1-11.

FIG. 12 is a block diagram of an example computing device 1200 that can implement the features and processes of FIGS. 1-11. The computing device 1200 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the computing device 1200 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions. Other sensors 1216 can also be connected to the peripherals interface 1206, such as a global navigation satellite system (GNSS) (e.g., GPS receiver), a temperature sensor, a biometric sensor, magnetometer or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips. The camera subsystem 1220 and the optical sensor 1222 can be used to collect images of a user to be used during authentication of a user, e.g., by performing facial recognition analysis.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the computing device 1200 is intended to operate. For example, the computing device 1200 can include communication subsystems 1224 designed to operate over a GSM network, a GPRS network, an EDGE network, a Wi-Fi or WiMax network, and a Bluetooth™ network. In particular, the wireless communication subsystems 1224 can include hosting protocols such that the device 100 can be configured as a base station for other wireless devices.

An audio subsystem 1226 can be coupled to a speaker 1228 and a microphone 1230 to facilitate voice-enabled functions, such as speaker recognition, voice replication, digital recording, and telephony functions. The audio subsystem 1226 can be configured to facilitate processing voice commands, voiceprinting and voice authentication, for example.

The I/O subsystem 1240 can include a touch-surface controller 1242 and/or other input controller(s) 1244. The touch-surface controller 1242 can be coupled to a touch surface 1246. The touch surface 1246 and touch-surface controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration can disengage a lock of the touch surface 1246; and a pressing of the button for a second duration that is longer than the first duration can turn power to the computing device 1200 on or off. Pressing the button for a third duration can activate a voice control, or voice command, module that enables the user to speak commands into the microphone 1230 to cause the device to execute the spoken command. The user can customize a functionality of one or more of the buttons. The touch surface 1246 can, for example, also be used to implement virtual or soft buttons and/or a keyboard.

In some implementations, the computing device 1200 can present recorded audio and/or video files, such as MP3, AAC, and MPEG files. In some implementations, the computing device 1200 can include the functionality of an MP3 player, such as an iPod™.

The memory interface 1202 can be coupled to memory 1250. The memory 1250 can include high-speed random-access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks.

The operating system 1252 can include instructions for handling basic system services and for performing hardware dependent tasks. In some implementations, the operating system 1252 can be a kernel (e.g., UNIX kernel). In some implementations, the operating system 1252 can include instructions for performing voice authentication. For example, operating system 1252 can implement the screen recording features as described with reference to FIGS. 1-11.

The memory 1250 can also store communication instructions 1254 to facilitate communicating with one or more additional devices, one or more computers and/or one or more servers. The memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Navigation instructions 1268 to facilitate GNSS and navigation-related processes and instructions; and/or camera instructions 1270 to facilitate camera-related processes and functions.

The memory 1250 can store software instructions 1272 to facilitate other processes and functions, such as the screen recording processes and functions as described with reference to FIGS. 1-11.

The memory 1250 can also store other software instructions 1274, such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the computing device 1200 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   receiving, by an operating system of a computing device through a network, a message from a remote recording device requesting a remote screen recording of media content presented on a display of the computing device;
   presenting, by the operating system of the computing device, a prompt on the display of the computing device requesting user permission to initiate the remote screen recording responsive to receiving the message;
   in response to receiving user permission to initiate the remote screen recording session, initiating, by the operating system of the computing device, a first remote screen recording session of a session manager component of the operating system local to the computing device to record first media content presented by a first application on the display of the computing device and a second remote screen recording session of the session manager component to record second media content presented by a second application on the display of the computing device;
   while either of the first remote screen recording session and the second remote screen recording session are in progress, presenting, by the operating system of the computing device on the display of the computing device, indicia indicating that screen recording is in progress;
   obtaining, by the operating system of the computing device, first video frames corresponding to the first media content presented by the first application and second video frames corresponding to the second media content presented by the second application on the display of the computing device; and
   sending, by the operating system of the computing device, the first video frames corresponding to the first media content presented by the first application and the second video frames corresponding to the second media content presented by the second application to the remote recording device.

2. The method of claim 1, wherein presenting the indicia comprises modifying the presentation of the first and/or second media content on the display of the computing device so that the first and/or second media content is presented inset in a colored frame that surrounds the first and/or second media content, the colored frame indicating that the remote screen recording is in progress, and wherein the media content is protected from unauthorized access by digital rights management (DRM) or an access control technology applied to the media content by a third party.

3. The method of claim 1, further comprising:
   broadcasting, by the computing device, a message on the network indicating the availability of the computing device on the network, wherein the message is received at the remote recording device and the remote recording device establishes a communication channel with the computing device based on the message.

4. The method of claim 1, further comprising:
   receiving the first media content presented on the display of the computing device from the first application running on the computing device;
   sending a notification to the first application, prior to initiating the first remote screen recording session on the computing device, that the first media content presented on the display of the computing device is being recorded; and
   obtaining, by the computing device, in response to sending the notification to the first application, first modified media content from the first application,
   wherein presenting the indicia comprises presenting the first modified media content instead of the first media content protected from unauthorized access on the display of the computing device, and
   wherein the first video frames sent to the remote recording device are obtained from the first modified media content instead of the first media content protected from unauthorized access.

5. The method of claim 1, further comprising:
   in response to receiving the user permission to initiate the remote screen recording session and prior to initiating the first remote screen recording session on the computing device:
   sending, by the operating system of the computing device, a notification to the first application requesting permission to record the first media content presented on the display of the computing device; and
   obtaining, by the operating system of the computing device, permission from the first application to record the first media content from the application.

6. A non-transitory computer readable medium including one or more sequences of instructions that, when executed by one or more processors, cause the processors to perform operations comprising:
   receiving, by an operating system of a computing device through a network, a message from a remote recording device requesting a remote screen recording of media content presented on a display of the computing device;
   presenting, by the operating system of the computing device, a prompt on the display of the computing device requesting user permission to initiate the remote screen recording responsive to receiving the message;

in response to receiving user permission to initiate the remote screen recording session, initiating, by the operating system of the computing device, a first remote screen recording session of a session manager component of the operating system local to the computing device to record first media content presented by a first application on the display of the computing device and a second remote screen recording session of the session manager component to record second media content presented by a second application on the display of the computing device;

while either of the first remote screen recording session and the second remote screen recording session are in progress, presenting, by the operating system of the computing device on the display of the computing device, indicia indicating that screen recording is in progress;

obtaining, by the operating system of the computing device, first video frames corresponding to the first media content presented by the first application and second video frames corresponding to the second media content presented by the second application on the display of the computing device; and sending, by the operating system of the computing device, the first video frames corresponding to the first media content presented by the first application and the second video frames corresponding to the second media content presented by the second application to the remote recording device.

7. The non-transitory computer readable medium of claim 6, wherein presenting the indicia comprises modifying the presentation of the first and/or second media content on the display of the computing device so that the first and/or second media content is presented inset in a colored frame that surrounds the first and/or second media content, the colored frame indicating that the remote screen recording is in progress, and wherein the media content is protected from unauthorized access by digital rights management (DRM) or an access control technology applied to the media content by a third party.

8. The non-transitory computer readable medium of claim 6, wherein the instructions cause the processors to perform operations comprising:

broadcasting, by the computing device, a message on the network indicating the availability of the computing device on the network, wherein the message is received at the remote recording device and the remote recording device establishes a communication channel with the computing device based on the message.

9. The non-transitory computer readable medium of claim 6, wherein the instructions cause the processors to perform operations comprising:

receiving the first media content presented on the display of the computing device from the first application running on the computing device;

sending a notification to the first application, prior to initiating the first remote screen recording session on the computing device, that the first media content presented on the display of the computing device is being recorded; and obtaining, by the computing device, in response to sending the notification to the first application, first modified media content from the first application, wherein presenting the indicia comprises presenting the first modified media content instead of the first media content protected from unauthorized access on the display of the computing device, and wherein the first video frames sent to the remote recording device are obtained from the first modified media content instead of the first media content protected from unauthorized access.

10. The non-transitory computer readable medium of claim 6, wherein the instructions cause the processors to perform operations comprising:

in response to receiving the user permission to initiate the remote screen recording session and prior to initiating the first remote screen recording session on the computing device:

sending, by the operating system of the computing device, a notification to the first application requesting permission to record the first media content presented on the display of the computing device; and obtaining, by the operating system of the computing device, permission from the first application to record the first media content from the application.

11. A system comprising:

one or more processors; and a non-transitory computer readable medium including one or more sequences of instructions that, when executed by the one or more processors, cause the processors to perform operations comprising:

receiving, by an operating system of a computing device through a network, a message from a remote recording device requesting a remote screen recording of media content presented on a display of the computing device;

presenting, by the operating system of the computing device, a prompt on the display of the computing device requesting user permission to initiate the remote screen recording responsive to receiving the message;

in response to receiving user permission to initiate the remote screen recording session, initiating, by the operating system of the computing device, a first remote screen recording session of a session manager component of the operating system local to the computing device to record first media content presented by a first application on the display of the computing device and a second remote screen recording session of the session manager component to record second media content presented by a second application on the display of the computing device;

while either of the first remote screen recording session and the second remote screen recording session are in progress, presenting, by the operating system of the computing device on the display of the computing device, indicia indicating that screen recording is in progress;

obtaining, by the operating system of the computing device, first video frames corresponding to the first media content presented by the first application and second video frames corresponding to the second media content presented by the second application on the display of the computing device; and sending, by the operating system of the computing device, the first video frames corresponding to the first media content presented by the first application and the second video frames corresponding to the second media content presented by the second application to the remote recording device.

12. The system of claim 11, wherein presenting the indicia comprises modifying the presentation of the first and/or second media content on the display of the computing device so that the first and/or second media content is presented inset in a colored frame that surrounds the first and/or second media content, the colored frame indicating that the remote screen recording is in progress, and wherein the media content is protected from unauthorized access by digital rights management (DRM) or an access control technology applied to the media content by a third party.

13. The system of claim 11, wherein the instructions cause the processors to perform operations comprising:
broadcasting, by the computing device, a message on the network indicating the availability of the computing device on the network, wherein the message is received at the remote recording device and the remote recording device establishes a communication channel with the computing device based on the message.

14. The system of claim 11, wherein the instructions cause the processors to perform operations comprising:
receiving the first media content presented on the display of the computing device from the first application running on the computing device;
sending a notification to the first application, prior to initiating the first remote screen recording session on the computing device, that the first media content presented on the display of the computing device is being recorded; and
obtaining, by the computing device, in response to sending the notification to the first application, first modified media content from the first application,
wherein presenting the indicia comprises presenting the first modified media content instead of the first media content protected from unauthorized access on the display of the computing device, and
wherein the first video frames sent to the remote recording device are obtained from the first modified media content instead of the first media content protected from unauthorized access.

15. The system of claim 11, wherein the instructions cause the processors to perform operations comprising:
in response to receiving the user permission to initiate the remote screen recording session and prior to initiating the first remote screen recording session on the computing device:
sending, by the operating system of the computing device, a notification to the first application requesting permission to record the first media content presented on the display of the computing device; and
obtaining, by the operating system of the computing device, permission from the first application to record the first media content from the application.

16. The system of claim 11, wherein the remote recording device is a playback device for presenting the first video frames, and wherein the computing device is a set-top box connected to the network and is configured to stream the first video frames to the playback device.

17. The method of claim 1, wherein the remote recording device is a playback device for presenting the first video frames, and wherein the computing device is a set-top box connected to the network and is configured to stream the first video frames to the playback device.

18. The method of claim 4, wherein the first modified media content is selected from a group consisting of: a warning in place of the first media content protected from unauthorized access, a watermark overlaid on the first media content protected from unauthorized access, a lower quality version of the first media content protected from unauthorized access, and a lower resolution version of the first media content protected from unauthorized access.

19. The non-transitory computer readable medium of claim 9, wherein the modified media content is selected from a group consisting of: a warning in place of the first media content protected from unauthorized access, a watermark overlaid on the first media content protected from unauthorized access, a lower quality version of the first media content protected from unauthorized access, and a lower resolution version of the first media content protected from unauthorized access.

20. The system of claim 14, wherein the modified media content is selected from a group consisting of: a warning in place of the first media content protected from unauthorized access, a watermark overlaid on the first media content protected from unauthorized access, a lower quality version of the first media content protected from unauthorized access, and a lower resolution version of the first media content protected from unauthorized access.

* * * * *